(12) United States Patent
Vobian et al.

(10) Patent No.: US 6,630,992 B1
(45) Date of Patent: Oct. 7, 2003

(54) METHOD AND DEVICE FOR EXECUTING CONTROL AND MONITORING MEASUREMENTS IN OPTICAL TRANSMISSION PATHS

(75) Inventors: Joachim Vobian, Mühltal (DE); Klaus Mörl, Jena (DE)

(73) Assignee: Deutsche Telekom AG, Bonn (DE)

(*) Notice: Subject to any disclaimer, the term of this patent is extended or adjusted under 35 U.S.C. 154(b) by 0 days.

(21) Appl. No.: 09/743,439

(22) PCT Filed: Jun. 23, 1999

(86) PCT No.: PCT/EP99/04361
§ 371 (c)(1),
(2), (4) Date: Jan. 9, 2001

(87) PCT Pub. No.: WO00/03504
PCT Pub. Date: Jan. 20, 2000

(30) Foreign Application Priority Data

Jul. 9, 1998 (DE) .......................... 198 30 729

(51) Int. Cl.[7] .................................................. G01N 21/00
(52) U.S. Cl. .................................................. 356/73.1
(58) Field of Search ........................ 356/73.1; 359/110, 359/135, 159, 161, 173, 153, 156, 180, 181, 179; 250/227.18, 227.23; 385/122, 126, 123, 24

(56) References Cited

FOREIGN PATENT DOCUMENTS

| DE | 27 16 788 | 10/1978 |
|----|-----------|---------|
| EP | 0 432 734 | 6/1991 |
| EP | 0 553 460 | 8/1993 |
| EP | 0 681 172 | 11/1995 |
| FR | 2 739 992 | 4/1997 |

*Primary Examiner*—Frank G. Font
*Assistant Examiner*—Tu T. Nguyen
(74) *Attorney, Agent, or Firm*—Kenyon & Kenyon

(57) ABSTRACT

A method and a system for carrying out control and monitoring measurements on optical transmission paths which can be used during regular operation and without disturbing the same to measure and control parameters of the transmission path as well as to monitor the transmission path with respect to tapping attempts. A control signal having wavelength that is different from the transmission signal into the transmission path, re-reflected after propagating through the transmission path and analyzed. To reflect the control signal, a wavelength-selective reflecting set-up, such as a dichroic reflector is used, which transmits the transmission signal substantially as an undisturbed signal. The reflected control signal is detected by a detecting device and analyzed with respect to polarization, intensity, signal shape, or other properties, making it possible to infer the properties of the transmission path and/or detect unwanted tampering with the transmission system.

8 Claims, 5 Drawing Sheets

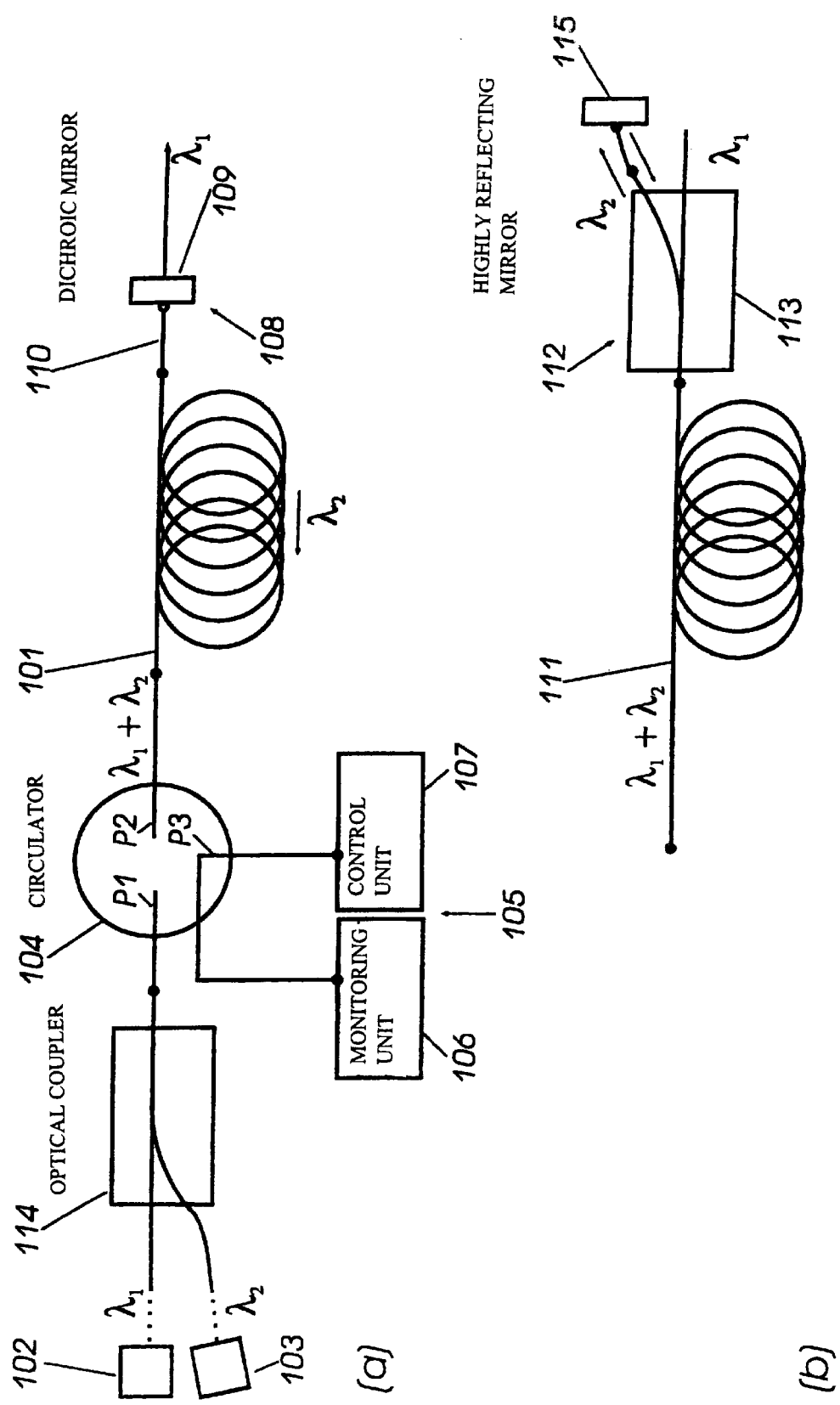
Fig. 1 BASIC DESIGN FOR CONTROL AND MONITORING MEASUREMENTS

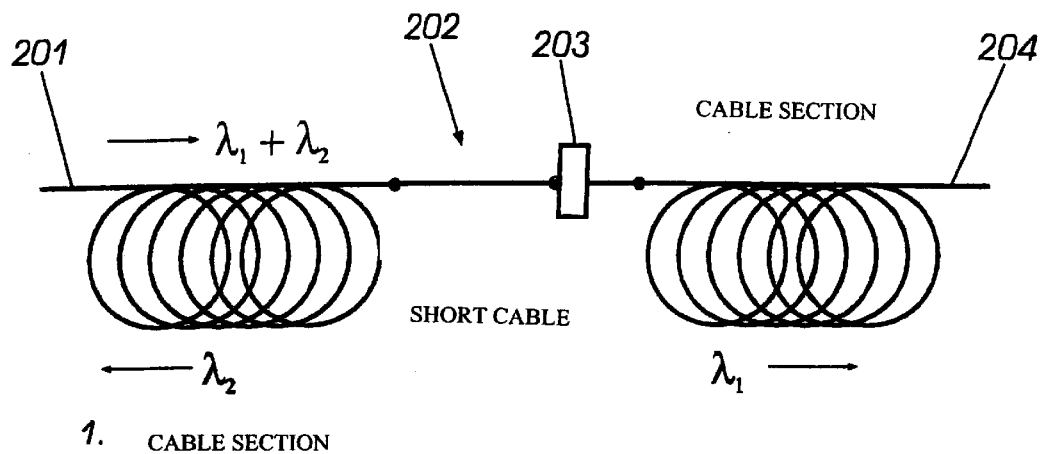
Fig. 2 TESTED, CONTROLLED TEST FIBER (1. CABLE SECTION) CONNECTED TO SUBSEQUENT CABLE SECTION VIA THE DICHROIC MIRROR
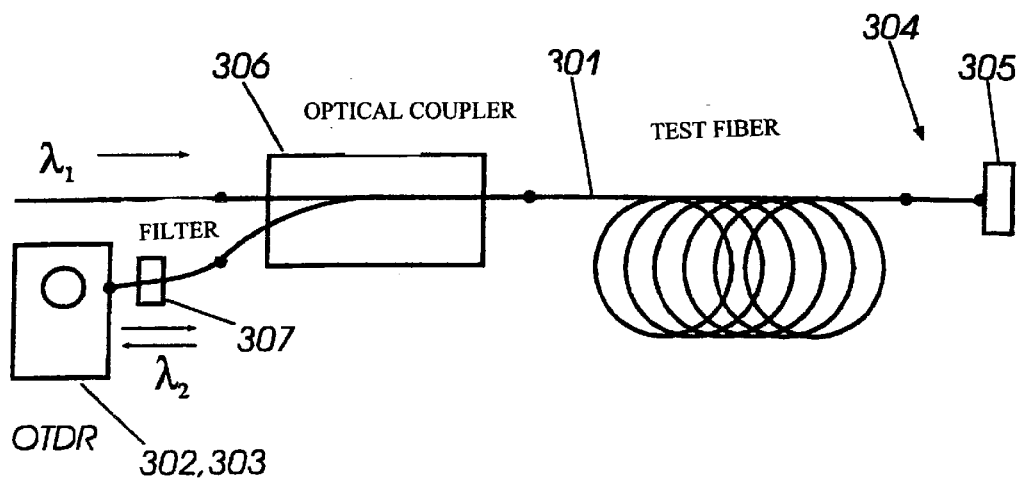
Fig. 3 OTDR-MEASUREMENTS DURING TELECOMMUNICATION OPERATIONS

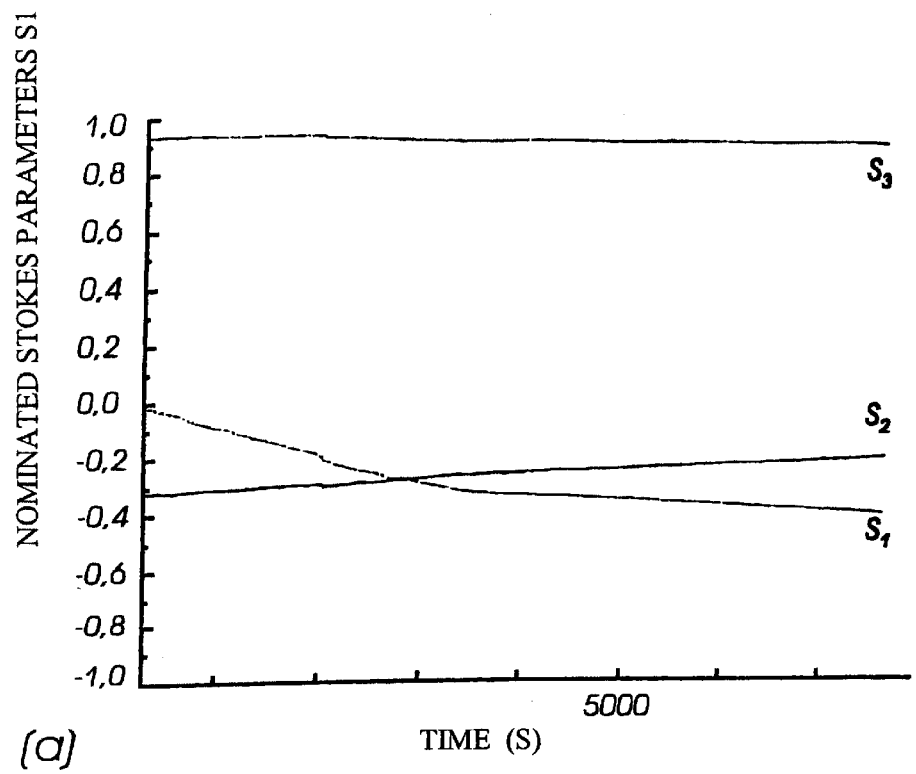
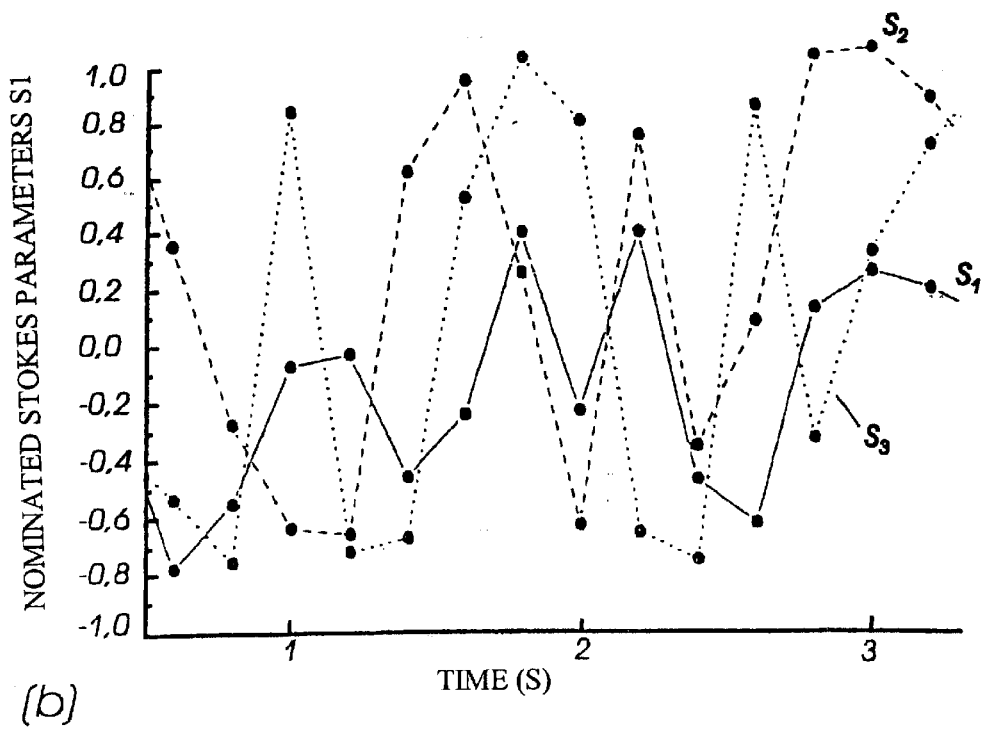
Fig. 4  FLUCTUATIONS IN STOKES PARAMETERS OF AN UNDISTURBED (a) AND A DISTURBED FIBER SECTION (b)

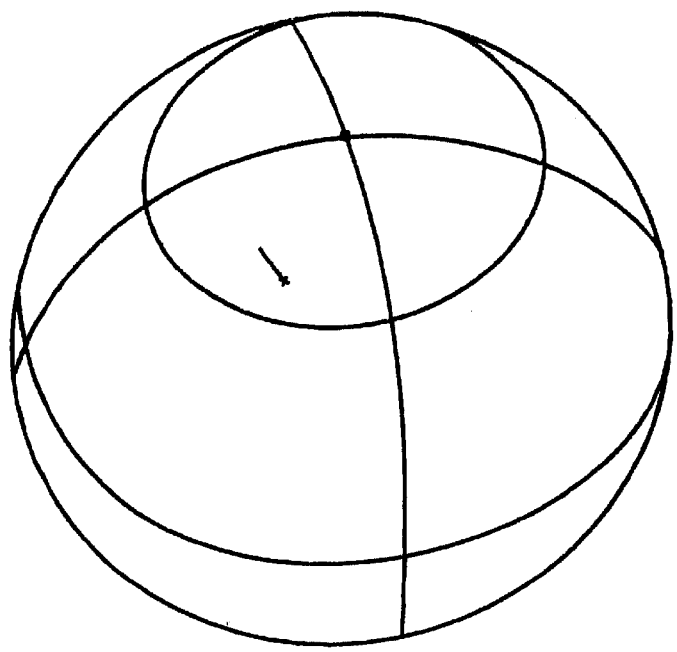
(c)
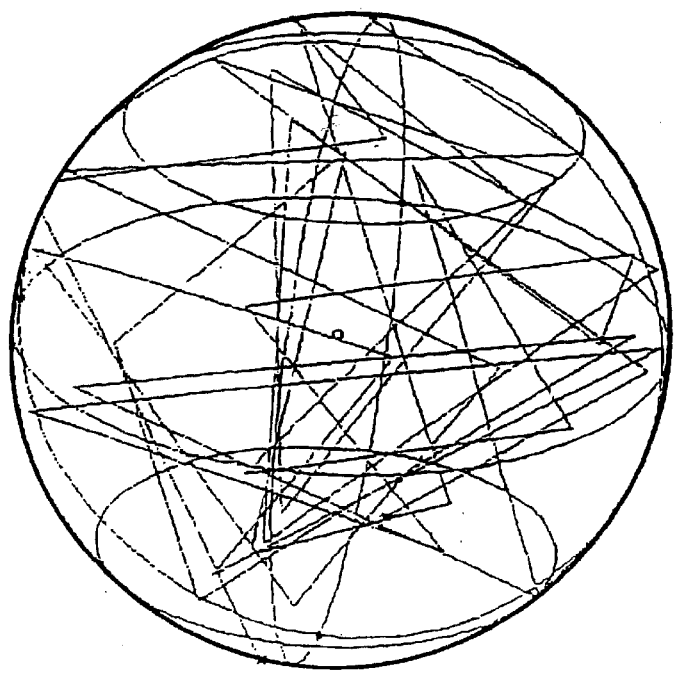
(d)
Fig. 4(cont.) TRACKS ON THE POINCARE SPHERE
(c) UNDISTURBED CONDITION (d) IN CASE OF DISTURBANCE

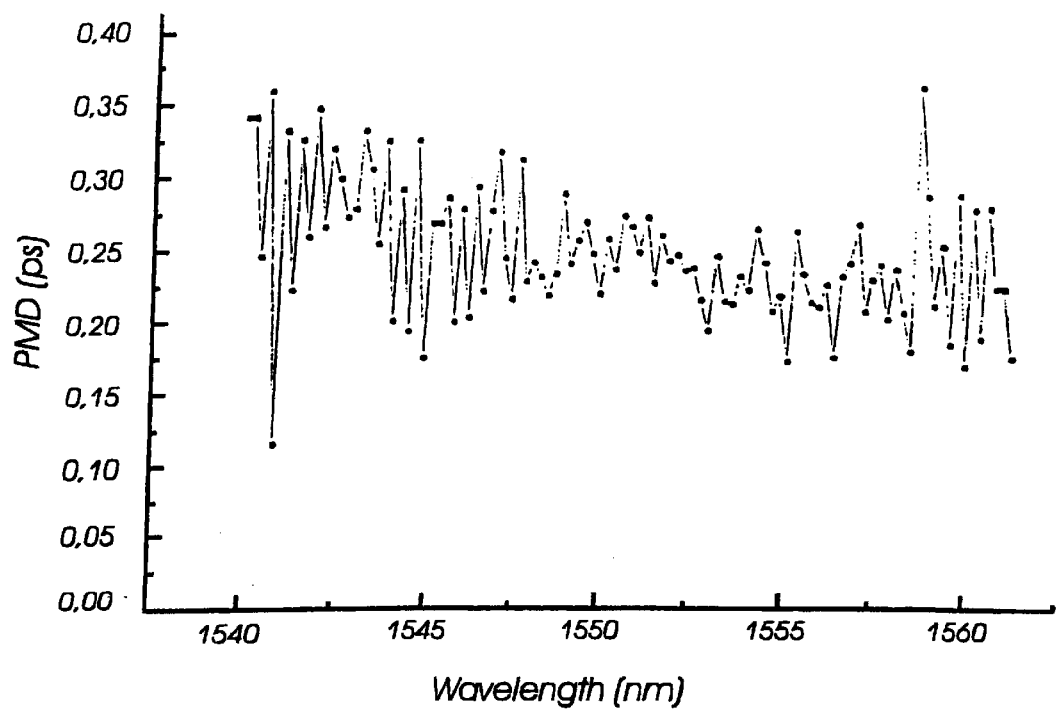
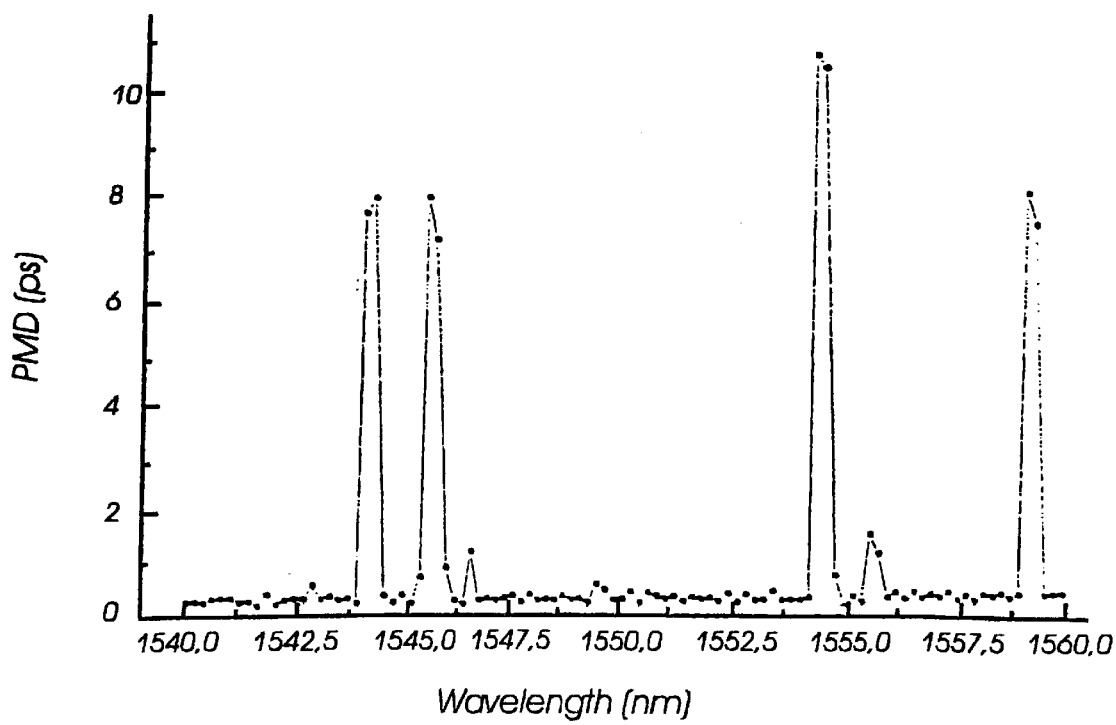
Fig. 5  PMD SPECTRUM OF A FIBERWARE ON A COLL (L = 23.13 km) BETWEEN 1540 AND 1560 NM WITHOUT (TOP) AND WITH DISTURBANCE (BOTTOM), MEASURED WITH A POLARIMETER IN ARC-ANGLE MODE $\Delta\lambda$ = 0.2 nm

METHOD AND DEVICE FOR EXECUTING CONTROL AND MONITORING MEASUREMENTS IN OPTICAL TRANSMISSION PATHS

FIELD OF THE INVENTION

The present invention relates to a method and a system for carrying out control measurements on optical transmission paths. The present invention further relates to a method and a system for carrying out monitoring measurements on optical transmission paths.

BACKGROUND OF THE INVENTION

In view of the high business use of optical transmission, the monitoring of the security of the transmission paths can be a critical ability. To provide anti-tapping and data-protection security, methods are known which assume substantial experimental outlay, for example, monitoring monomode fibers using cryptologic such as quantum cryptologic methods, or utilizing Raman or Brillouin backscattering. These very expensive methods may document the considerable interest that exists in achieving unaffected, trouble-free communication transmission.

In addition, regular control and checking of optical transmission paths are needed to maintain proper telecommunications operation via optical transmission paths. Special cable fibers or glass fibers can require continuous monitoring. Thus, the operational path must be able to be controlled in parallel with the normal telecommunications operation, without disturbing this operation.

French Patent No. 2 739 992, describes a monitoring system based on the analysis of reflected signals for an optical telecommunications network. This monitoring system makes use of Bragg gratings.

European Patent No. 0 432 734, describes a device and a method for detecting defective locations or damage on an optical transmission system.

Those systems appear to work with an additionally launched signal. The launched signal can be selectively reflected after propagating through part of or all of the entire transmission path and whose wavelength is different from the wavelength of the useful information to be transmitted.

However, those known systems are not suited for utilizing the chromatic dispersion that the signals propagating through the fiber are subject to in order to control the optical transmission path. Further, those known systems are not suited for utilizing the polarization state that the signals exhibit after propagating through the fiber in order to monitor the optical transmission path.

SUMMARY OF THE INVENTION

The present invention provides a method and a system for carrying out control measurements during normal telecommunications operation, without adversely affecting the same, and the chromatic dispersion, which the signals propagating through the fiber are subjected to, is utilized to control the optical transmission path.

The present invention further provides a method and a system for carrying out monitoring measurements during normal telecommunications operation, without adversely affecting the same, and the polarization state exhibited by the signals after propagating through the fiber and their propagation time are analyzed to monitor the optical transmission path.

The present invention further provides minimizing the technical outlay to a minimum. The method and the system, respectively, should make it possible to acquire important operating parameters for the transmission path and, additionally, to reliably detect any tampering with the transmission path, especially tapping of or eavesdropping on the data communication traffic.

BRIEF DESCRIPTION OF THE DRAWINGS

FIG. 1 shows the principal design layout of a system for making control and monitoring measurements in an embodiment of the present invention.

FIG. 2 shows schematically, a tested, controlled transmission path, which is coupled to a further transmission path in another embodiment of the present invention.

FIG. 3 shows OTDR measurements on a transmission path of another embodiment of the present invention.

FIGS. 4a shows fluctuations in the Stokes parameters of an interference-free fiber line as a function of time in another embodiment of the present invention.

FIG. 4b shows fluctuations in the Stokes parameters of an interfered fiber line as a function of time in another embodiment of the present invention.

FIG. 4c shows a depiction of the polarization state of the reflection signal on the Poincaré sphere in the interference-free state in another embodiment of the present invention.

FIG. 4d shows a depiction of the polarization state of the reflection signal on the Poincaré sphere in the interfered case in another embodiment of the present invention.

FIG. 5 shows the polarization mode dispersion of a fiber as a function of the wavelength in the interference-free and interfered states, respectively, in another embodiment of the present invention.

DETAILED DESCRIPTION

Transmission paths are, for example, individual optical fibers or fiber bundles combined to form a data cable, or also already networked fibers/cables, or those which are interrupted by one or a plurality of additional elements, such as line repeaters. The transmission path has an input and an output, which, here, define the transmitting and receiving side, respectively. On the transmit side, data are encoded in the form of optical signals (transmission signals), for which purpose a transmitter having an operational wavelength $\lambda_1$ is used, and are launched into the transmission path. It is not necessary for the transmitter of the transmission signal to be located in the immediate vicinity of the transmit-side input of the transmission path; other transmission elements can be connected therebetween. On the receive side, the data are decoupled or extracted from the transmission path, analyzed, or routed to other transmission paths.

In this context, the operational wavelength is not necessarily exactly a fixed wavelength due to the time modulation, transmission signals have a certain bandwidth, operational wavelength being understood to be the fundamental wavelength of the transmission signal. In addition, the transmission path can be used in wavelength division multiplex operation ("WD. operation"). In the process, a plurality of signals having different fundamental wavelengths, which each encode different, mutually independent pieces of information, are superimposed on the transmit side to form a transmission signal, are transmitted, and separated again on the receive side. Therefore, according to the present invention, the operational wavelength $\lambda_1$ is the wavelength range in which data are transmitted in the case of the transmission path to be monitored.

In an embodiment of the present invention, an optical control signal is generated having a control wavelength $\lambda_2$, which is different from operational wavelength $\lambda_1$. $\lambda_2$ is likewise to be viewed as the fundamental wavelength of the control signal, which itself can have a certain bandwidth. In addition, at the same time, a plurality of signals having different wavelengths can be generated, which, along the lines of the present invention, can be coupled together to form a control signal in the manner of the WD. operation.

The system in accordance with the present invention has a transmitter for producing the control signal, which, in some instances, can be used apart from the transmitter for producing the transmission signal. On the transmit side, the control signal can be launched into the transmission path. In this context, the coupling mechanism can be selected so as to enable a parallel launching of the transmission signal. For this, the system according to an embodiment of the present invention may include a coupler, which is configured on the transmit side in the area of the transmission path and which is able to launch the signals from both transmitters into the transmission path. The coupler can be a multiplex coupler, for example, as also used for WD. operation (for example, a Y-coupler). Due to the different wavelengths, the transmission signal and, thus, the regular coupling of data may not be disturbed.

The control signal can be transmitted over the transmission path, reflected on the receive side, and retransmitted over the transmission path, back to the transmit side. For this, the system in accordance with the present invention has a reflecting set-up, which is configured on the receive side of the transmission path and is able to reflect the control wavelength, the re-reflected control signal (reflection signal) being launched on the receive side again into the transmission path.

The reflecting set-up can includes, for example, a dichroic reflector or a dichroic layered reflector system, which transmits radiation in the range of the operational wavelength and reflects radiation in the range of the control wavelength, and is arranged at the output of the transmission path. A reflector of this kind, adapted to the particular wavelengths, can allow the transmission signal to pass through with only little attenuation, so that the regular data transmission is not disturbed. The same applies to a reflecting set-up, which includes a multiplex coupler, and can be used in this embodiment of the present invention as a demultiplexer and as having at least two wavelength-dependent outputs and one reflector that is highly reflecting for the radiation in the range of the control wavelength. The output of the multiplex coupler for radiation in the range of the operational wavelength can be coupled to a receiver for transmission signals or to another transmission path; the highly reflecting reflector is configured at the output for radiation in the range of the control wavelength.

In the next method step, the re-reflected control signal (reflection signal) on the transmit side can be decoupled from the transmission path and fed to a detecting device. The launching of the control and transmission signals may be essentially unaffected by the decoupling of the reflection signal. In some instances, decoupled light of the operational wavelength $\lambda_1$, is suppressed.

The reflection signal can be decoupled, for example, by the (multiplex) coupler used for launching, which acts as a demultiplexer for the reflected beam. In another embodiment of the present invention, the system for decoupling the reflection signal can include a circulator which is arranged in the area of the transmit side end of the transmission path.

The circulator can be used for the transmit side launching of the already multiplexed transmission and control signal into the transmission path and for the transmit-side decoupling of the reflection signal out of the transmission path. The reflection signal can be fed to the detecting device.

Finally, according to an method embodiment of the present invention, the detecting device can be configured to emit an output signal which is indicative of the intensity and/or of the polarization state, in some instances as a function of time, and/or the signal propagation time of the reflection signal, from which one can derive transmission properties of the transmission path and/or changes in the transmission properties, in particular those caused by tampering with the transmission path; through analysis of the reflection signal, one determining the chromatic dispersion of the fiber, in particular the zero dispersion wavelength $\lambda_0$, the rise in the dispersion curve at $\lambda_0$, and/or the dispersion values in the second or third optical window.

The second optical window is understood here to be the spectral range of 1,280 nm to 1,350 nm; the third optical window is understood to be that of 1,480 nm to 1,700 nm.

For this, the detecting device may include a detector which is able to detect radiation of the control wavelength and which emits an intensity-dependent electrical output signal. The detecting device may additionally include at least one polarization-sensitive element, such as a polarizer, a polarization beam splitter, a polarizing fiber coupler, in particular, however, a polarimeter for detecting at least one component of the Stokes vector, preferably of the entire polarization state of the reflection signal. In addition, the detecting device can include a data processing system for further analysis of the detector signals.

Finally, according to another embodiment of the present invention, the detecting device can be configured to emit an output signal which is indicative of the intensity and the polarization state, in some instances as a function of time, and the signal propagation time of the reflection signal, from which one can derive transmission properties and/or changes in the transmission properties of the transmission path, in particular those caused by tampering with the transmission path.

For this, the detecting device can include a detector, which is able to detect radiation of the control wavelength and which emits an intensity-dependent electrical output signal. The detecting device can also include at least one polarization-sensitive element, such as a polarizer, a polarization beam splitter, a polarizing fiber coupler, or a polarimeter for detecting at least one component of the Stokes vector, of the entire polarization state of the reflection signal. In addition, the detecting device can include a data processing system for further analysis of the detector signals.

The methods according to the present invention may be used for controlling and monitoring the security of installed telecommunications cables or individual fibers of the same, continually or for certain time periods, without entailing substantial outlay. In the embodiments according to the present invention, the control or monitoring measurements can be made on the transmit side of the transmission system, where generally the transmission system is also installed. The space requirements of the system according to the present invention can be quite modest and having low technical complexity.

The embodiments according to the present invention can also provide that the control and monitoring measurements in no way impede the normal data transfer; that is, the normal data transfer can continue in parallel. Further, the optical components of the present invention are inexpensive, so the economic outlay remains modest as compared to other known methods.

FIG. 1 depicts the principle of a design layout in accordance with the present invention to be used for taking control and monitoring measurements on an optical transmission path 101 or 111. FIG. 1b represents an alternative way for implementing the present invention on the receiving side in accordance with FIG. 1a. The left (transmit side) part of the system in accordance with the present invention from FIG. 1b corresponds to that from FIG. 1a.

Besides the optical transmission signal having operational wavelength $\lambda_1$, which is generated by a transmitter 102, a control signal having control wavelength $\lambda_2$ is generated by a second transmitter 103 and is launched into a coupler 114. Coupler 114 is a broadband Y-coupler, e.g., a multiplex coupler. On the output side, coupler 114 is linked to a circulator 104 via its port P1. Port P2 of circulator 104 is coupled, e.g., intermateably connected or spliced, to the input of transmission path 101 to be tested. Linked to third port P3 of circulator 104 is detecting device 105, which, here, is made up of a monitoring measuring instrument 106 and a control measuring instrument 107 for carrying out control and monitoring measurements.

The circulator has the property of allowing light coupled into port P1 to pass substantially with low loss non-dissipatively to port P2, but to significantly attenuate the transmission to port P3. On the other hand, light coupled into port P2 is directed to port P3, the transmission from P2 to P1 being significantly attenuated. Consequently, circulator 104 functions as an optical valve, which directs radiation into various output channels, depending on the direction of propagation.

Mounted, respectively, at the output of transmission path 101 and 111 is a reflecting set-up 108 and 112 used for reflecting the control signal having control wavelength $\lambda_2$. In FIG. 1a, reflecting set-up 108 includes a short glass fiber segment 110, on whose back end a dichroic reflector 109 is mounted. The front end of glass fiber segment 110 is provided, for example, with an optical connector, which is used to intermateably connect it to the receiving-side output of the transmission path. Dichroic reflector 109 reflects in the range of control wavelength $\lambda_2$, preferably with a reflection coefficient of more than 95%, ideally of more than 99%, and transmits in the range of operational wavelength $\lambda_1$, preferably with a transmittance of at least 95%.

Dichroic reflector 109 can be integrated in a special connector, e.g., by adhesively mounting a dichroic layered reflector system on the end face of the connector. Dichroic layered reflector system can be designed to allow operational wavelength $\lambda_1$, to pass with a high transmittance through the reflector. The transmission signal is then fed to the following cable section; see, e.g., FIG. 2, or received and analyzed by a receiver. On the other hand, control wavelength $\lambda_2$ is reflected with a high efficiency. With the aid of the only slightly attenuated operational wavelength, the operating traffic is sustained; on the other hand, the reflected control wavelength is used on the transmit side to continuously monitor transmission path 101, as well as for control measurements.

An alternative implementation of a reflecting set-up 112 is illustrated in FIG. 1b. In this case, reflecting set-up 112 includes a coupler 113, which functions as a demultiplexer. The transmission signal having operational wavelength $\lambda_1$, is fed via one arm of coupler 113 to the next cable section or to a receiver. The control signal, on the other hand, is carried in the second arm of the coupler, at whose output is mounted a reflector 115 which is highly reflective—at least in the range of the control wavelength. Reflector 115 is preferably designed as a highly reflective fiber connector, which is coupled into the corresponding output of demultiplexer 113. The control signal is reflected off of this reflector 115 in such a way that it is again launched, on the receive-side, into transmission path 111, arrives at port P2 of circulator 104 and, finally, is transmitted to detecting device 105.

The reflected radiant power is decoupled at port P3 of circulator 104 and supplied as a reflection signal to detecting device 105, i.e., to one of measuring instruments 106, 107. On the basis of the reflection signal, all types of control and monitoring measurements can be carried out without the actual telecommunications operation being interfered with or affected. Coupler 114 can be broadband and suited for wavelengths in the range of 1,300 to 1,650 nm. The junction losses are preferably less than 0.2 dB. The present invention may also employ a circulator, including a circulator which is broadband. A circulator can be used for each of the two optical windows. The junction losses in the first case are preferably less than 0.8 dB, in the second case less than 0.6 dB. The insulation values for a transmission from port P2 to P1, and port P3 to P2 are preferably greater than 35 dB in the first case, preferably greater than 45 dB in the second case. The directivity preferably amounts to at least 60dB, in accordance with a very high insulation on the direct path from port P1 to P3.

Depending on the operating system, operational wavelength $\lambda_1$, is within the second or third optical window, thus around 1,300 or 1,550 nm. There are no fundamental restrictions for control wavelength $\lambda_2$. The control wavelength is preferably greater than the operational wavelength, i.e., greater than 1,600 nm. When working with conventional, standard optical fibers having a critical wavelength of about 1,300 nm, in the case of such a large wavelength, a considerable portion of the control signal is propagated in the fiber cladding. This makes the fiber very sensitive to bends in the fiber, i.e., in the cable, thereby increasing the sensitivity of the measuring process. To avoid high fiber attenuation, too large of a control wavelength should not be selected. It should lie preferably within the third optical window.

Transmitters 102 and 103 for the transmission signal, i.e., the control signal, are radiation sources which produce optical signals having a high beam quality. Infrared lasers can be used, such as dye lasers or laser diodes. The control signal can be generated in pulse or continuous wave operation. In some instances, additional information can also be modulated on the control signal, for example, for bit error rate measurements. To carry out wavelength-dependent measurements, the control signal can be tuned, also with respect to the control wavelength, e.g., to measure the spectral polarization mode dispersion (see FIG. 4). For this, thermally tunable DFB semiconductors or tunable external cavity lasers are used, for example.

In the connection between port P2 of circulator 104 and transmission path 101, as well as in the case of all other optical couplings within the propagation path of the transmission signal, the aim is to avoid reflections. For this, the optical connections can be designed as spliced joints. If a plug connection is needed, then immersion oil should be used inside the connector. The reflection at the coupling points preferably amounts to less than 1%.

FIG. 2 schematically depicts how an examined, controlled transmission path 201, which forms a first cable section, is linked via a dichroic reflector 203 to another transmission path 204, which forms a second cable section. In this context, as in FIG. 1a, dichroic reflector 203 is the main component of reflecting set-up 202, which reflects control wavelength $\lambda_2$, but transmits the actual transmission signal having wavelength $\lambda_1$, as a substantially unaffected signal, to the second cable section. In place of second transmission path 204, any other element used on the receiver side in optical transmission systems, can be mounted behind dichroic reflector 203.

The optical set-up in accordance with FIGs. 1a and 1b makes it possible for control and monitoring measurements to be made substantially free of interference, even during regular telecommunications operation. In this context, control measurements are understood to be those measurements used for controlling the transmission properties of the transmission path. This includes measuring or testing specific fiber parameters, e.g., chromatic dispersion, along with its essential parameters, such as zero dispersion wavelength $\lambda_0$, the rise in the dispersion curve at $\lambda_0$, or the dispersion values in the second and third optical window, the spectral path attenuation, the polarization mode dispersion, or also bit error rate measurements.

On the other hand, monitoring measurements are measurements which are relevant to the security of the transmission system. Monitoring measurements make it possible, for example, to detect any tampering with the transmission path. Thus, for example, "eavesdropping" on the data communication traffic by tapping off even the smallest amounts of power can be registered.

In some embodiments of the present invention, neither of the two measurement types is subject to any fundamental restrictions, particularly since one can utilize the advantage of the method of accommodating all transmitting and measuring devices on the transmit side, so that all data are directly available for analysis. On the receiver-side, one merely needs to provide for reflection of the control signal.

Thus, for example, useful-life measurements can be easily carried out on a continuous basis as interference-free control measurements. By comparing the reflection signal and the originally produced control signal, one can infer a multiplicity of transmission path parameters, for example, with respect to polarization, propagation time, signal shape, amplitude or intensity. Using a set-up in accordance with FIG. 1, these measurements are able to be performed by selecting a suitable detecting device, which is able to detect the particular quantities of interest.

In addition, as control measurements, it is possible to directly measure the length of cable fibers. It is known that the length of an optical fiber is substantially greater than that of a corresponding cable; moreover, the individual fibers of a cable vary in length. These measurements turn out to be very simple and are carried out, for example, using a structure of the present invention in accordance with FIG. 3.

FIG. 3 shows a transmission system, which is made up of a transmission path 301, over which a transmission signal having wavelength $\lambda_1$ is transmitted. The transmission signal comes from a transmitter, in some instances via another section of the transmission system (other fiber path). According to the present invention, a control signal having wavelength $\lambda_2$ is transmitted via transmission path 301 to measure properties of transmission path 301. The control signal can be generated by an optical time domain reflectometer (OTDR), which is equipped with a transmitter 302 of control wavelength $\lambda_2$.

The control signal can be launched, together with the transmission signal, by a coupler 306 into transmission path 301. After propagating through transmission path 301, the signal can be reflected off of a reflector 305 mounted at the output of transmission path 301, the transmission signal being transmitted. The alternative illustrated in FIG. 1a may also be used as a reflecting set-up in this embodiment of the present invention.

The circulator from the structure according to FIG. 1 is not necessarily needed in the optical set-up according to FIG. 3 since the OTDR, as receiver 303, analyzes the backscattered light having $\lambda_2$. A simple bandpass filter 307 upstream from the input or output of the OTDR can suppress the backscattered radiation having $\lambda_1$. The design layout principle is illustrated in FIG. 3.

The OTDR can generate a short control signal having $\lambda_2$ and analyze the backscattered signal. The optical length of the transmission path is determined from the time difference between producing the control signal and receiving the reflection signal. Plotting the OTDR measured backscattered power logarithmically over the optical path in the test fiber, one obtains a descending straight line (negative slope angle). The fiber end is defined by the occurring Fresnel pulse. Steps in the descending straight lines indicate spliced joints; the step height is an index for the splice attenuation. Fiber breakages or defects produce Fresnel reflections, which enable them to be precisely pinpointed. The relation between the measured group propagation time $t_g$ and fiber length L is $L = t_g c/n_g$, i.e., given exact knowledge of $n_g$, L, i.e., each distance between locations in the fiber can be precisely defined. Using special measuring arrangements, the OTDR can also be used to measure the locally distributed PMD.

Besides the control measurements, monitoring measurements which are relevant to security are also able to be simply implemented in accordance with the present invention without entailing significant technical outlay. For monitoring measurements, the design layout in accordance with FIG. 1 is used, for example.

In a first method, the relative attenuation of the control signal is determined on the transmit-side with the aid of detecting device 105. This method may proceed in accordance with the Heitmann measuring method (W. Heitmann, Precision Single-Mode Fiber Spectral Attenuation Measurements, J. Opt. Comm., vol. 8 (1987), no. 1, p. 2; W. Heitmann Attenuation Analysis of Silica-Based Single-Mode Fibers, J. Opt. Comm., vol. 11 (1990), no. 4, p. 122).

Because the absolute attenuation values are not the sole focus of interest, but rather also and more particularly the small changes in attenuation are, the so-called rear cut-off method is not needed. In the rear cut-off method, following a transmission measurement, the fibers are cut off a few meters behind the launching site, and the transmission power is measured once again. Highly precise attenuation measurements are obtained when the launching conditions pertaining to the control signal are kept constant (max. 0.001 dB). Every intervention made at the transmission path in question or at the fibers of the same is detected by measuring the attenuation. Any tapping of a line for eavesdropping purposes causes optical power to be decoupled via the fiber cladding. Even the tapping off of very small optical power of minimally 0.002 dB that this causes is able to be detected by measuring the attenuation.

In this case, a spectral attenuation measurement is not needed; a measurement of the control wavelength suffices. The control wavelength should be selected to be as large as possible, since large wavelengths in the monomode range mean that a considerable portion of the optical power is conducted in the fiber cladding, so that changes in attenuation caused by tinkering with the fibers are greater and, therefore, able to be detected more reliably. However, the control wavelength size selected should be such that the attenuation losses over the entire transmission path are still justifiable in a normal case, in other words, when there is no external intervention.

Another method for carrying out a monitoring measurement in accordance with the present invention is based on the fact that the polarization state (SOP) of a signal transmitted via a fiber path is sensitive to the bending and vibration of the fiber: when the fiber is tampered with, its birefringence is locally changed, causing the polarization state of the signal to also change abruptly. This method is by far more sensitive than the attenuation method and, for the most part, makes it impossible for someone to tamper with the cable without it being discovered.

This change in the SOP can easily be verified, for example, using a polarimeter, by plotting the Stokes vector on the Poincaré sphere. Sketched in FIG. 1a,b is the fundamental structure for monitoring paths by observing the polarization state using a polarization-sensitive monitoring unit 106. FIG. 4a shows the time characteristic of the three components $S_1$, $S_2$, $S_3$ of the Stokes vector in the undisturbed state; the measuring time is 8000 s. FIG. 4b is the time characteristic of the Stokes components within only 3 s in a disturbance case. The illustration impressively documents the dramatic effect of disturbances on the time characteristic of the SOP. This is likewise impressively confirmed by the corresponding plotting on the Poincaré sphere in accordance with FIGS. 4c and 4d.

FIG. 4c shows the slow drift of the SOP on the spherical surface in the undisturbed state (measuring time, again 8000 s), while in FIG. 4d, the disturbance case is shown (measuring time 3 s), in which the Stokes vector fluctuates considerably over the entire spherical surface area. One observes the large difference in the observation time, on the one hand 8000 s, on the other hand only 3 s.

There are several ways to verify the change in the SOP. The most complicated method has been mentioned above. In that method, a polarimeter is used to detect the complete polarization state. In the undisturbed operation, the SOP changes, e.g., as a consequence of thermal influences, very slowly and steadily (see FIGS. 4a and 4c). The point on the surface of the Poincaré sphere, which represents the particular polarization state, slowly drifts in one arbitrary direction. However, if the fiber is touched, the point's position changes suddenly; in response to any tampering with the fiber, the movement of the SOP point changes in direction and absolute value virtually randomly (see FIGS. 4b and 4d). This process is so conspicuous, that it is immediately noticeable and detectable.

The sudden change in the SOP due to an external disturbance can be manifested by an elevated polarization mode dispersion (PMD) and is able to be detected by measuring the PMD. For this, FIG. 5 shows the spectral pattern of the polarization mode dispersion in ps between 1,540 and 1,560 nm (above) without disturbance and (below) with disturbance, which are caused by the test fiber being contacted; in this case a 23.13 km long glass fiber on a coil. In this case, the disturbances at 1,545, 1,555 and 1,559 nm can increase the PMD values by a factor of up to 25. FIG. 5 documents the strong influence of disturbances, even on the PMD. As a measuring method in the sense of the work introduced here, this method is only considered when the control wavelength is varied using a tunable laser, and the time divergence of the signal is plotted as a function of the wavelength. The requirement to tune the laser makes this too time-consuming for routine measurements.

In a second method, ascertaining the change in the SOP does not necessitate fully defining it by the three scaled Stokes parameters using a polarimeter. To detect the change in the SOP, it can suffice to measure one or two components of the Stokes vector (see FIGS. 4a,b). For that reason, to have a less expensive variant, the polarimeter is replaced by a polarization-sensitive element (polarizer, polarization beam splitter, polarization-dependent fiber coupler, etc.). The radiation concentrations passing through these components are detected, and the corresponding detector voltages analyzed. For as long as the fibers rest undisturbed in the cable, the detector voltage changes only very slowly and steadily. On the other hand, in response to disturbances or manipulations, there is a sudden and pronounced change. Therefore, to distinguish among these very different effects, it is advantageous to use a discriminator when carrying out automatic monitoring. This can be a frequency filter, for example, which eliminates low frequencies (e.g., <0.1 Hz). To enhance evaluation security, in addition to the frequency filter, a threshold-value switch can be used to prevent small, noise-type voltage values from being analyzed, which also contain very high frequency components. Only amplitudes above the threshold value, which should be able to be variably adjusted, are plotted.

What is claimed:

1. A method for carrying out control measurements on an optical transmission path, comprising:

transmitting a transmission signal via the optical transmission path having a transmit side and a receive side, the transmission signal being transmitted via the optical transmission path having a path form of optical signals having an operational wavelength;

transmitting an optical control signal having a control wavelength which is different from the operational wavelength, on the transmit side of the optical transmission path and into the optical transmission path, selecting a coupling mechanism to enable a parallel transmission of the transmission signal;

reflecting the optical control signal on the receive side of the optical transmission path;

retransmitting the optical control signal over the optical transmission path to the transmit side of the optical transmission path;

decoupling the reflection signal formed by the re-reflected optical control signal on the transmit side of the optical transmission path, from the optical transmission path and feeding the reflection signal to a detecting device, where the transmitting of the optical control signal and the transmission signal are substantially unaffected by the decoupling of the reflection signal;

emitting an output signal by the detecting device, the output signal being indicative of at least one of intensity state, polarization state, intensity as a function of time, polarization as a function of time and signal propagation time of the reflection signal, and from the output signal deriving transmission properties of at least one of the optical transmission path and changes in the transmission properties; and determining chromatic dispersion of the optical transmission path by analyzing the reflection signal, the chromatic dispersion being at least one of a zero dispersion wavelength, a rise in a dispersion curve at zero dispersion wavelength and dispersion values in one of a second and a third optical window.

2. The method as recited in claim 1, wherein the decoupling of the reflection signal includes suppressing any decoupled light of the operational wavelength.

3. The method as recited in claim 1, wherein the method is carried out during normal transmission operation and further comprising launching the control signal in parallel with the transmission signal into the optical transmission path.

4. The method as recited in claim 1, wherein the reflecting of the control signal on the receive side of the optical transmission path has a reflection coefficient greater than about 95% and the transmitting of the transmission signal has a transmittance greater than about 95%.

5. The method as recited in claim 1, wherein the control wavelength is selected so that the control wavelength is at least partially transmitted over a cladding of an optical fiber of the optical transmission path, the control wavelength is not substantially attenuated during the transmission.

6. The method as recited in claim 1, further comprising:
determining at least one of a spectral path attenuation and a polarization mode dispersion through analysis of the reflection signal.

7. The method as recited in claim 1, further comprising:
filtering the time-dependent output signal of the detecting device to suppress random fluctuations, the bandwidth of the output signal being about 0.1 Hz to about 100 Hz.

8. A method for carrying out monitoring measurements on an optical transmission path, comprising:
launching a transmission signal via the optical transmission path in the form of an optical control signal having an operational wavelength, the optical transmission path having a transmit side and a receive side;
launching the optical control signal on the transmit side into the optical transmission path, the optical control signal having a control wavelength;
selecting a coupling mechanism so as to enable a parallel launching of the transmission signal;
reflecting the optical control signal on the received side of the optical transmission path and retransmitting the reflected optical control signal to the transmit side over the optical transmission path;
decoupling a reflection signal formed by the retransmitted reflected optical control signal on the transmit side from the optical transmission path and feeding the reflection signal to a detecting device, where the decoupling of the reflection signal does at least one of essentially not affecting the launching of the transmission signal and of the optical control signal and suppressing the decoupled light of the operational wavelength;
emitting an output signal by the detecting device, the output signal being indicative of at least one of intensity, polarization state, intensity as a function of time, polarization state as a function of time and signal propagation time of the reflection signal, and deriving from the output signal at least one of: transmission properties of the optical transmission path, changes in the transmission properties, and changes in the transmission properties caused by tampering with the optical transmission path; and
by analyzing the reflection signal, determining at least one of a chromatic dispersion of the optical transmission path, a zero dispersion wavelength, a rise in a dispersion curve at the zero dispersion wavelength, dispersion values in one of a second and third optical window, a spectral path attenuation, and a polarization mode dispersion.

* * * * *